(12) United States Patent
Jones et al.

(10) Patent No.: US 8,929,900 B2
(45) Date of Patent: *Jan. 6, 2015

(54) METHOD, BASE STATION AND MOBILE STATION FOR TDD OPERATION IN A COMMUNICATION SYSTEM

(75) Inventors: William J. Jones, Chippenham (GB); Joseph C. Cheung, Santa Clara, CA (US); Alan E. Jones, Wiltshire (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/979,560

(22) Filed: Dec. 28, 2010

(65) Prior Publication Data
US 2011/0090826 A1   Apr. 21, 2011

Related U.S. Application Data

(63) Continuation of application No. 10/544,451, filed as application No. PCT/GB2004/000526 on Feb. 11, 2004, now Pat. No. 7,890,113.

(30) Foreign Application Priority Data

Feb. 11, 2003   (GB) .................................. 0303079.8

(51) Int. Cl.
| H04W 40/00 | (2009.01) |
| H04L 5/14 | (2006.01) |
| H04W 16/04 | (2009.01) |
| H04J 4/00 | (2006.01) |
| H04B 7/26 | (2006.01) |
| H04W 16/06 | (2009.01) |

(52) U.S. Cl.
CPC *H04J 4/00* (2013.01); *H04W 16/06* (2013.01); *H04L 5/1438* (2013.01); *H04W 16/04* (2013.01); *H04B 7/2643* (2013.01)

USPC ........ 455/447; 455/444; 455/552.1; 370/319; 370/321

(58) Field of Classification Search
USPC ........ 455/434, 435.1, 435.2, 454, 515, 550.1, 455/552.1
See application file for complete search history.

(56) References Cited

U.S. PATENT DOCUMENTS 6,009,087 A * 12/1999 Uchida et al. ................. 370/335
6,029,071 A *  2/2000 Bertocci et al. ............... 455/463

(Continued)

FOREIGN PATENT DOCUMENTS

| EP | 1259092 A2 | 11/2002 |
| GB | 2398455 A | 8/2004 |

(Continued)

OTHER PUBLICATIONS

Korean Office Action issued Apr. 13, 2011, in Patent Application No. 10-2010-7028593.

(Continued)

*Primary Examiner* — Mehmood B Khan
(74) *Attorney, Agent, or Firm* — Oblon, Spivak, McClelland, Maier & Neustadt, L.L.P.

(57) ABSTRACT

A method, NodeB and User Equipment for TDD operation in a communication system operating in TDD mode in a frequency band allocated for FDD operation. Preferably, operation is in TDD uplink and downlink mode in a first frequency band designated or normally used for FDD uplink communication, and in TDD downlink-only mode in a second frequency band designated or normally used for FDD downlink communication. The invention provides the following advantages: Provides a flexible method to deploy a time division duplex architecture in frequency division duplex spectrum. Allows flexible use of system capacity by adjusting the uplink and downlink capacity split. Removes previous FDD duplex restrictions.

29 Claims, 3 Drawing Sheets

(56) References Cited

U.S. PATENT DOCUMENTS

| | | | |
|---|---|---|---|
| 6,847,622 | B1 | 1/2005 | Emmons, Jr. et al. |
| 6,859,655 | B2 * | 2/2005 | Struhsaker .................... 455/450 |
| 7,239,621 | B2 | 7/2007 | Eriksson et al. |
| 7,502,596 | B2 * | 3/2009 | Takao et al. .................... 455/78 |
| 2002/0055360 | A1 * | 5/2002 | Chen et al. .................... 455/452 |
| 2002/0071480 | A1 * | 6/2002 | Marjelund et al. ............ 375/141 |
| 2002/0089957 | A1 | 7/2002 | Viero |
| 2002/0098821 | A1 | 7/2002 | Struhsaker |
| 2007/0019575 | A1 * | 1/2007 | Shaheen .................... 370/310 |

FOREIGN PATENT DOCUMENTS

| | | | |
|---|---|---|---|
| JP | 2002-521988 | | 7/2002 |
| JP | 2011-024255 A | | 2/2011 |
| JP | 2011-24256 | | 2/2011 |
| JP | 2011-41303 | | 2/2011 |
| KR | 2001-0074747 | | 8/2001 |
| WO | WO-98/32236 | | 6/1998 |
| WO | WO-00/07399 | | 2/2000 |
| WO | WO 00/07399 | * | 2/2000 ............... H04Q 7/36 |
| WO | WO-00/42800 A1 | | 7/2000 |
| WO | WO-02058270 A2 | | 7/2002 |

OTHER PUBLICATIONS

Haas, H. et al. (Sep. 8-11, 1998) "Outage probability of CDMA-TDD micro cells in a CDMA-FDD environment," The Ninth IEEE Symposium on Personal, Indoor and Mobile Radio Communications, Boston, MA.

"3rd Generation Partnesrship Project; Technical Specification Group Radio Acess Network; UTRAN Overall Description (Release 6)." (Sep. 2005) 3GPP:Valbonne France TS 25.401 v6.7.0:1-48.

"3rd Generation Partnership Project: Technical Specification Group Services and System Aspects; General Packet Radio Service (GPRS); Service description: Stage 2 (Release 6)" (Mar. 2006). 3GPP: Valbonne, France, TS 23.060 v6. 12.0:1-212.

Great Britain Search Report mailed Sep. 2, 2003 for Great Britain Application No. 0303079.8 filed Feb. 11, 2003, 3 pages.

International Search Report and Written Opinion mailed Jun. 4, 2004, for PCT Application No. PCT/GF2004/000526 filed on Feb. 2, 2004, 14 pages.

Kim. D. H. et al. (May 2001). "Capacity Analysis of TDD Cell Sharing Underutilized FDD Uplink," IEEE 53rd Vehicular Technology Conference 4:3044-3048.

Povey, G. J. R. et al. (Oct. 1997). "TDD-CDMA Extension to FDD-CDMA Based Third Generation Cellular System," IEEE 6th International Conference on Universal personal communications Record 2:813-817.

Wong, W. et al. (Jun. 1999). "Frequency Selection Strategies for Hybrid TDD/FDD-CDMA Cellular Networks," IEEE International Conference on Communications 2:1152-1156.

"3rd Generation Partnership Project: Technical Specification Group Radio Access Network; Physical Channels and Mapping of Transport Channels onto Physical Channels (TDD) (Release 7)," (Mar. 2006). 3GPP: Valbonne, France, TS 25.221 V7.0.0:1-139.

Great Britain Search Report mailed Sep. 3, 2003 for Great Britain Application No. 0312186.0.3 pages.

International Search Report mailed Sep. 1, 2004, for PCT Application No. PCT/GB2004/002307 filed on May 28, 2004, 3 pages.

Korean Office Action issued Jun. 28, 2013, in Korea Patent Application No. 10-2013-7008554 (with English translation).

Japanese Office Action issued Aug. 13, 2013, in Japan Patent Application No. 2010-215114.

Office Action issued Jan. 28, 2014 in Japanese Patent Application No. 2013-143483.

Office Action issued Mar. 21, 2014 in Korean Patent Application No. 10-2013-7008554 (with English language translation).

Luiz Magalhaes, et al., "Transport Level Mechanisms for Bandwidth Aggregation on Mobile Hosts" IEEE, Network Protocols, Nov. 11-14, 2001, pp. 165-171.

* cited by examiner

US 8,929,900 B2

METHOD, BASE STATION AND MOBILE STATION FOR TDD OPERATION IN A COMMUNICATION SYSTEM

CROSS REFERENCE TO RELATED APPLICATIONS

This application is a Continuation of and is based upon and claims the benefit of priority under 35 U.S.C. §120 for U.S. Ser. No. 10/544,451 filed Jun. 16, 2006, the entire contents of which are incorporated herein by reference. U.S. Ser. No. 10/544,451 is a National Stage of PCT/GB2004/000526, filed Feb. 11, 2004, and claims the benefit of priority under 35 U.S.C. §119 from United Kingdom Patent Application No. 0303079.8, filed Feb. 11, 2003.

FIELD OF THE INVENTION

This invention relates to communication systems and particularly Time Division Duplex (TDD) operation in cellular communication systems.

BACKGROUND OF THE INVENTION

In the field of this invention it is known that first and second generation cellular standards all use "Frequency Division Duplex" (FDD) in which there are separate downlink (base station to mobile) and uplink (mobile to base station) frequency allocations. These allocations are separated by a "duplex spacing" to prevent interference between the simultaneous transmission and reception taking place at both the base station and mobile. FDD allocations are typically termed "paired spectrum".

"Time Division Duplex" (TDD) is used in more recent standards, such as "$3^{rd}$ Generation Partnership Project" (3GPP) "Time Division-Code Division Multiple Access" (TD-CDMA) and 3GPP "Time Division-Synchronous Code Division Multiple Access" (TD-SCDMA). In TDD systems, transmission and reception takes place alternately in time on the same frequency. TDD is very well suited for packet data communication where uplink and downlink capacity can easily be adjusted to meet subscriber traffic profile.

TDD is not used in FDD bands, because of interference concerns. TDD can operate in the mobile transmit (uplink) portion of a FDD band without detrimental interference. The allocation of TDD channels immediately adjacent to the FDD uplink channels in the "International Mobile Telecommunications 2000" (IMT-2000, International Telecommunication Union designated '3G' band) provides evidence of the feasibility of this. The frequency allocation for IMT-2000 is shown in FIG. 1.

However, operation of TDD in the downlink portion of an FDD band is problematic, because of adjacent channel interference from existing FDD base stations to the receivers of co-located or nearby TDD base stations, both of which typically transmit at higher power than the corresponding user terminals.

Consequently, where a wireless operator has an FDD spectrum allocation, TDD technology can normally only be operated in the FDD uplink part of the spectrum, leaving the FDD downlink spectrum unutilized and effectively 'wasted'.

A need therefore exists for an arrangement, method and unit for TDD operation in a communication system wherein the abovementioned disadvantage (s) may be alleviated.

STATEMENT OF INVENTION

In accordance with a first aspect of the present invention there is provided a method for TDD operation in a communication system as claimed in claim 1.

In accordance with a second aspect of the present invention there is provided a base station for TDD operation in a communication system as claimed in claim 8.

In accordance with a third aspect of the present invention there is provided a mobile station for TDD operation in a communication system as claimed in claim 15.

BRIEF DESCRIPTION OF THE DRAWINGS

One method, base station and mobile station for TDD operation in a communication system incorporating the present invention will now be described, by way of example only, with reference to the accompanying drawings, in which.

DESCRIPTION OF PREFERRED EMBODIMENT(S)

The present invention is based on the realization by the inventors that it is possible to:

- Enable operation of TDD technology in a band allocated as paired spectrum for FDD
- Provide the ability to use the FDD downlink spectrum effectively to provide capacity and therefore avoid wastage. This is referred to as an auxiliary TDD downlink channel.
- Avoid detrimental interference in operation of TDD in the FDD downlink spectrum.
- Remove the fixed duplex frequency separation requirement.

Figure 1:
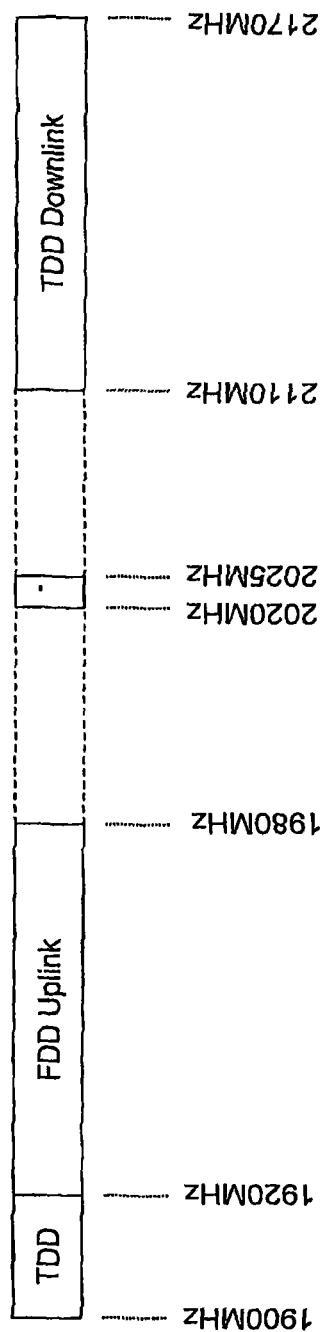
FIG. 1 shows a block schematic illustration of IMT-2000 frequency allocation.
Figure 2:
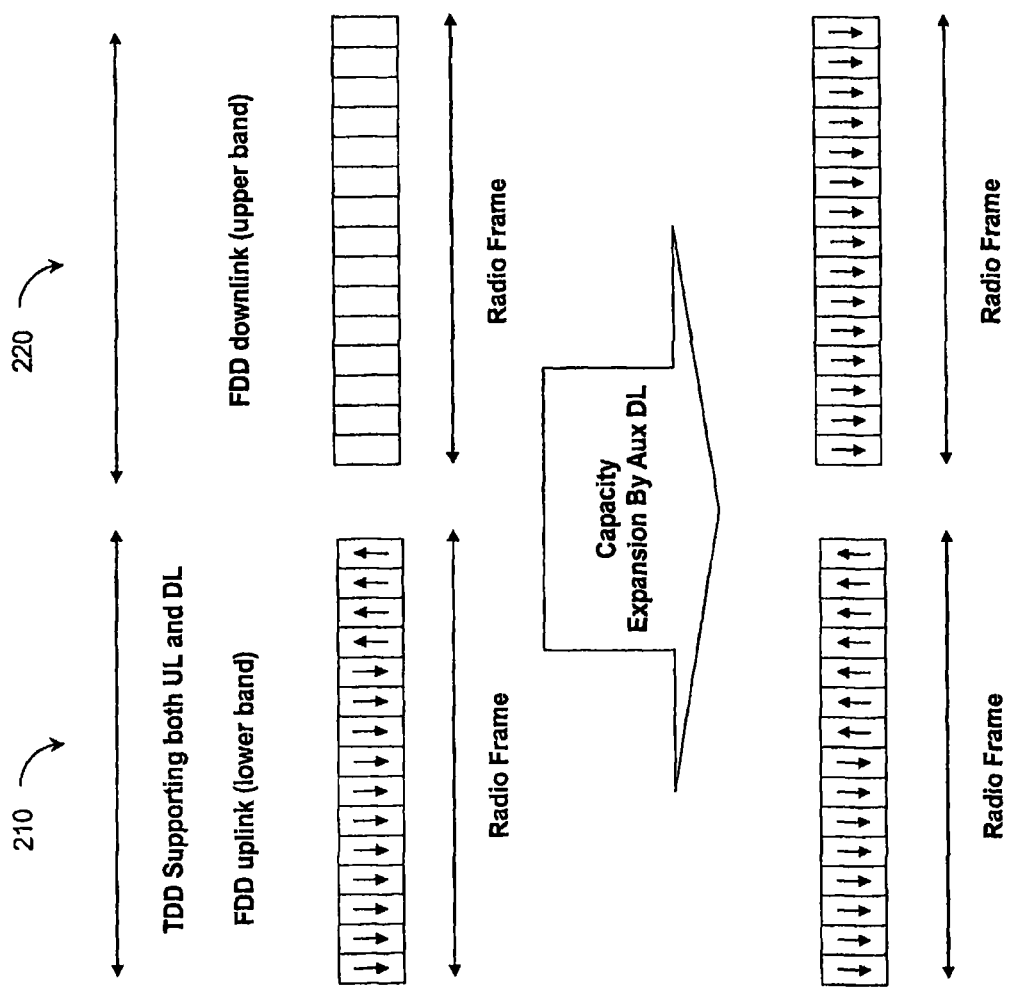
FIG. 2 shows a block schematic illustration of TDD with auxiliary downlink utilization.

An example of TDD operation with auxiliary downlink is shown in FIG. 2. As illustrated, standard TDD operates in the uplink FDD spectrum (210) while the auxiliary downlink operates in the downlink FDD spectrum (220). In the illustration, an example of a 15-time slot frame structure is shown. An upward pointing arrow in a radio frame denotes an uplink time slot, and a downward pointing arrow denotes a downlink time slot. As can be seen, system capacity is expanded by use of the auxiliary downlink.

Figure 3:
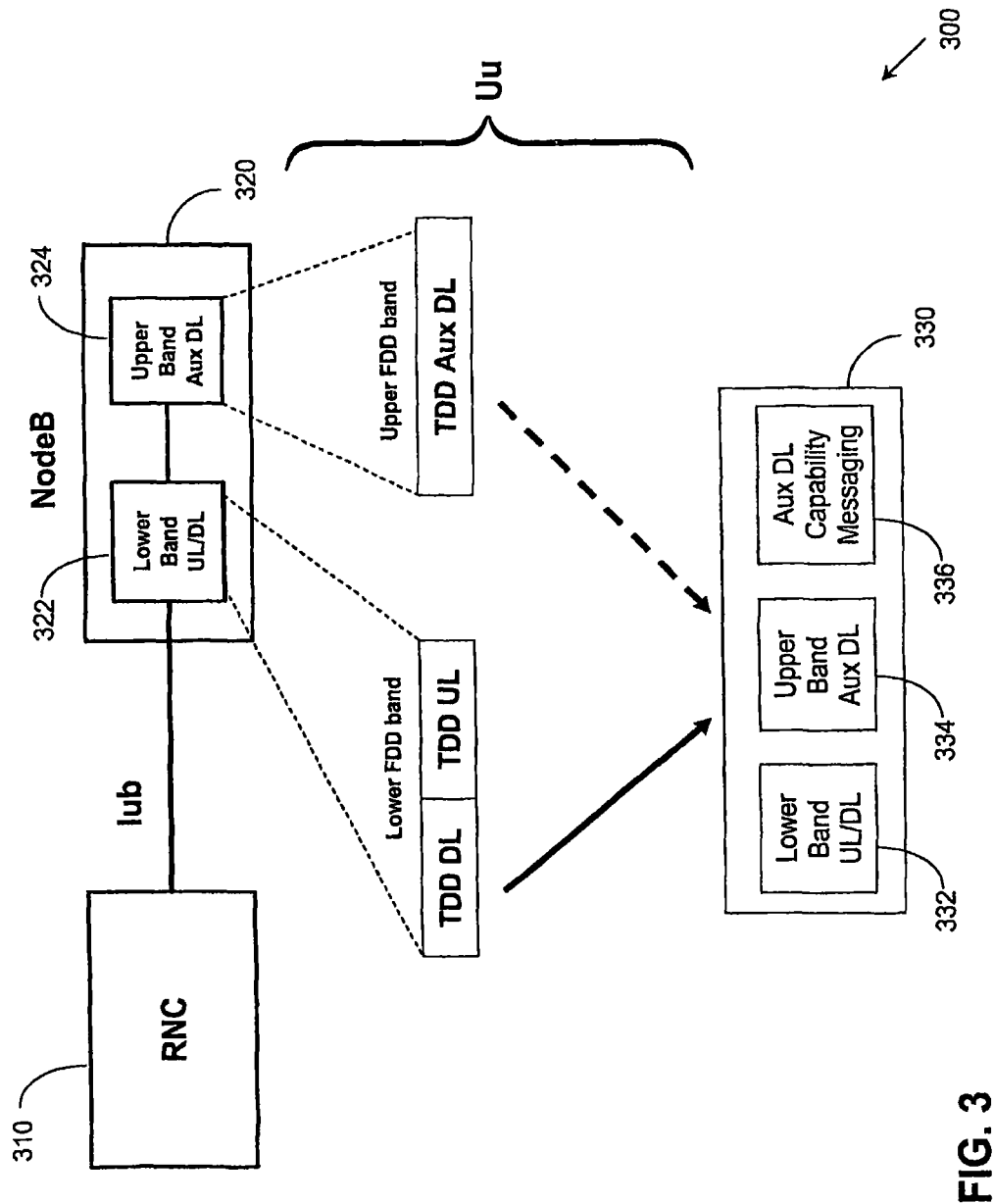
FIG. 3 shows a block schematic illustration of system architecture of TDD with auxiliary downlink.

FIG. 3 shows the basic architecture of a 3GPP cellular communication system 300 incorporating the present invention. As illustrated, a NodeB (or base station) 320 is controlled (over the 'Iub' interface) by a Radio Network Controller (RNC) 310 and communicates over the Uu radio interface with User Equipment (UE or mobile terminal) 330.

It will be understood that in other respects the system 300 operates in accordance with relevant 3GPP Technical Specifications (available at the website http://www.3gpp.org), and need not be described in further detail herein. However, as will be explained further below, for the NodeB 320 the following is to be noted that the base station (NodeB) includes a lower band logical unit 322 and an upper band logical unit 324 and operates in both the upper (FDD downlink) and lower (FDD uplink) bands simultaneously, under the control of the RNC 310.

The lower band logical unit 322 supports normal TDD operation, where the radio resource is divided into time slots.

The upper band logical unit 324 supports auxiliary downlink operation. This logical unit supports downlink operation only. The radio resource is divided into time slots.

In the system of FIG. 3, three types of UE 330 can be supported:
1. Single frequency standard TDD UE (not shown):
    This is the standard TDD UE where both uplink and downlink operate on a single frequency. This type of UE will operate by communicating with the lower band logical unit in the NodeB.
2. Single instantaneous frequency UE (not shown):
    This type of UE is able to tune to two different frequencies (the lower and upper FDD bands) in the same TDD frame under the control of the network. The UE operates uplink transmission in the lower FDD band. The UE can operate in either the standard TDD downlink (lower FDD band) or auxiliary downlink (upper FDD band) under the control of the network.
3. Dual simultaneous frequency UE 330:
    This type of UE has a lower band UL/DL logical unit 332, an upper 'Aux DL' logical unit 334 and an 'Aux DL' Capability Messaging logical unit 336, and is able to simultaneously tune to both the lower and upper FDD bands. The UE operates uplink transmission in the lower FDD band. The UE operates standard TDD downlink (lower FDD band) and auxiliary downlink (upper FDD band) under the control of the network. With dual simultaneous frequency capability the UE is able to operate with increased downlink capacity.

In operation of the system of FIG. 3, the auxiliary downlink ('Aux DL') capability allows an inherently TDD technology to efficiently utilize the FDD downlink band, avoiding wastage of spectrum, and the downlink resource in the lower and upper bands is treated as a combined 'single pool' resource, which can be allocated to users according to demand. The NodeB 320 provides common signalling for both TDD frequencies.

At any time, an individual UE that can support the 'Aux DL' mode of operation may be allocated downlink capacity in the lower band or upper band or both.

UEs and NodeBs exchange 'Aux DL' capability messages, such that the NodeBs and UEs with and without the 'Aux DL' feature can co-exist in the network and each operate to the best of their respective abilities.

A UE that does not support auxiliary downlink, e.g., a roaming UE from another TDD network, is compatible with the auxiliary downlink architecture by operating in standard TDD mode in lower band. In this case, the auxiliary downlink feature is transparent to the UE.

While the Auxiliary Downlink increases the total downlink capacity, it also enables uplink capacity to be increased, as additional timeslots can be allocated in the lower TDD band to uplink traffic channels.

The separation of the lower and upper band is not restricted by the standard FDD duplex frequency separation. The UE is instructed by the network to tune to the correct frequency for the auxiliary downlink. At the network level the auxiliary downlink in the upper band can even be adjacent to the lower band (even though the UE may be required to operate only on one downlink frequency at one time to minimize the receive filtering requirements). This effectively allows the operator to deploy the proposed TDD technology in contiguous frequency allocation.

It will be understood that the arrangement, method and unit for TDD operation in a communication system described above provides the following advantages:
    Provides a flexible method to deploy a time division duplex architecture in frequency division duplex spectrum.
    Allows flexible use of system capacity by adjusting the uplink and downlink capacity split.
    Removes previous FDD duplex restrictions.

The invention claimed is:
1. A base station for communicating with a plurality of user equipment in a wireless communication system supporting multiple access, the base station comprising:
    processing circuitry configured to:
    exchange an auxiliary downlink capability message with a user equipment to indicate the user equipment is capable of supporting dual simultaneous downlink frequencies;
    communicate with the user equipment in a first frequency channel; and
    support auxiliary downlink communication with the user equipment in a second frequency channel in response to the auxiliary downlink capability message exchanged with the user equipment, so as to provide the user equipment with an increased capacity for receiving downlink communications utilizing common signaling for both the first frequency channel and the second frequency channel compared to other user equipment operating in the wireless communication system which are not capable of supporting dual simultaneous downlink frequencies;
    wherein the base station communicates simultaneously with the user equipment in downlink communication in both the first frequency channel and the second frequency channel in a paired band assigned to a mobile network operator.
2. The base station according to claim 1, wherein the processing circuitry is configured to
    operate in an uplink and downlink mode in the first frequency channel, and
    operate in a downlink-only mode in a second frequency channel allocated.
3. The base station according to claim 1, wherein the processing circuitry is configured to exchange messages with the user equipment of the wireless communication system to establish whether the user equipment is capable of operating in a first duplex mode in one of the frequency channels allocated for operation in a second duplex mode.
4. The base station according to claim 1, wherein the processing circuitry is configured to manage a plurality of frequencies as a single resource.
5. The base station according to claim 1, wherein the processing circuitry is configured to increase uplink capacity by increasing an allocation of uplink time slots in the first frequency channel.
6. The base station according to claim 1, wherein the wireless communication system comprises a 3GPP system and the base station comprises a Node B.
7. User equipment for communicating with a base station in a wireless communication system supporting multiple access for a plurality of user equipment, the user equipment comprising:
    processing circuitry configured to:
    exchange an auxiliary downlink capability message with the base station to indicate the user equipment is capable of supporting dual simultaneous downlink frequencies;
    communicate in a first frequency channel; and
    support auxiliary downlink communication in a second frequency channel, so as to provide the user equipment with an increased capacity to receive downlink communications utilizing common signaling for both the first frequency channel and the second frequency channel compared to other user equipment operating in the wire- less communication system which are not capable of supporting the dual simultaneous downlink frequencies;

wherein the user equipment communicates simultaneously with a base station in downlink communication in both the first frequency channel and the second frequency channel in a paired band assigned to a mobile network operator.

8. The user equipment according to claim 7, wherein the processing circuitry is configured to operate in an uplink and downlink mode in a first frequency channel allocated for uplink communication; and operate in a downlink-only mode in a second frequency channel allocated for downlink communication.

9. The user equipment according to claim 7, wherein the processing circuitry is configured to exchange messages with the base station to indicate the user equipment is capable of operating in a first duplex mode in a frequency channel allocated for operation in a second duplex mode.

10. The user equipment according to claim 7, wherein the processing circuitry is configured to increase uplink capacity by increasing the allocation of uplink time slots in the first frequency channel.

11. The user equipment according to claim 7, wherein the wireless communication system comprises a 3GPP wireless communication system.

12. User equipment for use in a wireless communication system supporting multiple access for a plurality of user equipment, the user equipment comprising:

processing circuitry configured to:

exchange an auxiliary downlink capability message to a base station with a base station to indicate that the user equipment is capable of supporting dual simultaneous downlink frequencies; and operate in a first downlink carrier frequency and an auxiliary downlink carrier frequency in a paired band assigned to a mobile network operator; and treat the first downlink carrier frequency and the auxiliary downlink carrier frequency as a single combined resource for simultaneous downlink allocation utilizing common signaling for both the first downlink carrier frequency and the auxiliary downlink carrier frequency, so as to provide the user equipment with an increased capacity for receiving downlink communications compared to other user equipment operating in the wireless communication system which are not capable of supporting the dual simultaneous downlink frequencies.

13. The user equipment according to claim 12, wherein the processing circuitry is further configured to operate using an uplink and downlink carrier in a first frequency channel allocated for uplink communication; and operate using a downlink-only carrier in a second frequency channel allocated for downlink communication.

14. The user equipment according to claim 12, wherein the processing circuitry is operable to exchange messages with the base station to indicate the user equipment is capable of operating in a first duplex mode in a frequency channel allocated for operation in a second duplex mode.

15. The user equipment according to claim 13, wherein the processing circuitry is configured to increase uplink capacity by increasing the allocation of uplink time slots in the first frequency channel.

16. The user equipment according to claim 12, wherein the wireless communication system comprises a 3GPP wireless communication system.

17. A base station for use in a wireless communication system supporting multiple access for a plurality of user equipment, the base station comprising:

processing circuitry configured to:

exchange an auxiliary downlink capability message with a user equipment to indicate the user equipment is capable of supporting dual simultaneous downlink frequencies; and operate in a first downlink carrier frequency and an auxiliary downlink carrier frequency in a paired band assigned to a mobile network operator in response to receiving the auxiliary downlink capability message from the user equipment, so as to provide the user equipment with an increased capacity for receiving downlink communications compared to other user equipment operating in the wireless communication system which are not capable of supporting the dual simultaneous downlink frequencies; and treat the first downlink carrier frequency and the auxiliary downlink carrier frequency as a single combined resource for simultaneous downlink allocation utilizing common signaling for both the downlink carrier frequency channel and the auxiliary downlink frequency.

18. The base station according to claim 17, wherein the processing circuitry is configured to operate using an uplink and downlink carrier in a first frequency channel allocated for uplink communication; and operate using a downlink-only carrier in a second frequency channel allocated for downlink communication.

19. The base station according to claim 17, wherein the processing circuitry is configured to exchange messages with the user equipment to establish whether the user equipment is capable of operating in a first duplex mode in a frequency channel allocated for operation in a second duplex mode and accordingly communicating with the base station.

20. The base station according to claim 18, wherein the processing circuitry is configured to increase uplink capacity by increasing the allocation of uplink time slots in the fast frequency channel.

21. The base station according to claim 17, wherein the wireless communication system comprises a 3GPP system and the base station comprises a Node B.

22. A method of communicating by a base station in a wireless communication system supporting multiple access for a plurality of user equipment, the method comprising:

exchanging an auxiliary downlink capability message with a user equipment to indicate the user equipment is capable of supporting dual simultaneous downlink frequencies; and communicating from the base station utilizing a first downlink carrier frequency and an auxiliary downlink carrier frequency in a paired band assigned to a mobile network operator; and treating the first downlink carrier frequency and the auxiliary downlink carrier frequency as a single combined resource for simultaneous downlink allocation utilizing common signaling for both the first downlink carrier frequency and the auxiliary downlink frequency carrier;

wherein the communicating further comprises providing the user equipment with an increased capacity for receiving downlink communications compared to other user equipment operating in the wireless communication system which are not capable of supporting the dual simultaneous downlink frequencies.

23. The method according to claim 22, further comprising:
operating in an uplink and downlink mode in a first frequency channel allocated for uplink communication; and
operating in a downlink-only mode in a second frequency channel allocated for downlink communication.

24. The method according to claim 22, further comprising exchanging messaging between the base station and the user equipment to establish whether the user equipment is capable of operating in a first duplex mode in a frequency channel allocated for operation in a second duplex mode and accordingly communicating between the base station and the user equipment.

25. The method according to claim 22, further comprising managing a plurality of frequencies as a single resource.

26. The method according to claim 23, further comprising increasing uplink capacity by increasing an allocation of uplink time slots in the first frequency channel.

27. A method of communicating by a user equipment in a wireless communication system supporting multiple access for a plurality of user equipment, the method comprising:
exchanging an auxiliary downlink capability message with a base station to indicate the user equipment is capable of supporting dual simultaneous downlink frequencies; and
communicating with the base station utilizing a first downlink carrier frequency and an auxiliary downlink carrier frequency in a paired band assigned to a mobile network operator;
treating the first downlink carrier frequency and the auxiliary downlink carrier frequency as a single combined resource for simultaneous downlink allocation utilizing common signaling for both the first downlink carrier frequency and the auxiliary downlink carrier frequency;
wherein the communicating further comprises providing the user equipment with an increased capability for receiving downlink communications compared to other user equipment operating in the wireless communication system which are not capable of supporting the dual simultaneous downlink frequencies.

28. A wireless communication system supporting multiple access for a plurality of user equipment, said wireless communication system comprising:
a base station that includes a receiver that exchanges an auxiliary downlink capability message with an user equipment that indicates the user equipment is capable of supporting dual simultaneous downlink frequencies; and
the user equipment including a transmitter that exchanges the auxiliary downlink capability message with the base station; wherein
the base station and the user equipment are configured to communicate with one another utilizing a first downlink carrier frequency and an auxiliary downlink carrier frequency in a paired band assigned to a mobile network operator;
the base station and the user equipment are configured to treat the first downlink carrier frequency and the auxiliary downlink carrier frequency as a single combined resource for simultaneous downlink allocation utilizing common signaling for both the first downlink carrier frequency and the auxiliary downlink carrier frequency, so as to provide the user equipment with an increased capacity for receiving downlink communications compared to other user equipment operating in the wireless communications system which are not capable of supporting the dual simultaneous downlink frequencies.

29. A method of communicating in a wireless communication system supporting multiple access for a plurality of user equipment, the method comprising:
exchanging an auxiliary downlink capability message by a base station with an user equipment of the plurality of user equipment to indicate the user equipment is capable of supporting dual simultaneous downlink frequencies utilizing an auxiliary downlink carrier frequency; and
communicating between the base station and the user equipment utilizing a first downlink carrier frequency and the auxiliary downlink carrier frequency in a paired band assigned to a mobile network operator;
treating the first downlink carrier frequency and the auxiliary downlink carrier frequency as a single combined resource for simultaneous downlink allocation utilizing common signaling for both the first downlink carrier frequency and the auxiliary downlink carrier frequency;
the communicating further comprises providing the user equipment with an increased capacity for receiving downlink communications compared to other user equipment operating in the wireless communication system which are not capable of supporting the dual simultaneous downlink frequencies.

* * * * *